April 23, 1935.  H. M. ROCKWELL  1,998,821
FLUID PRESSURE CONTROL CYLINDER FOR VEHICLES AND THE LIKE
Original Filed April 23, 1928
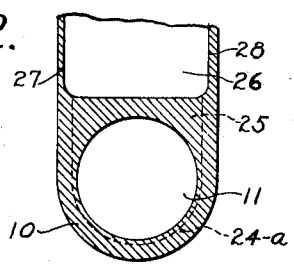
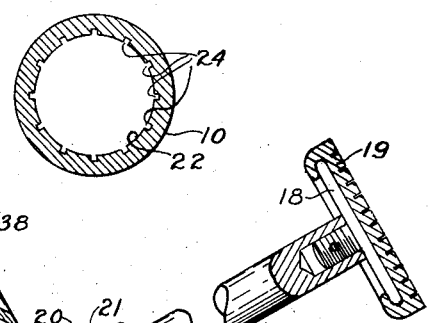
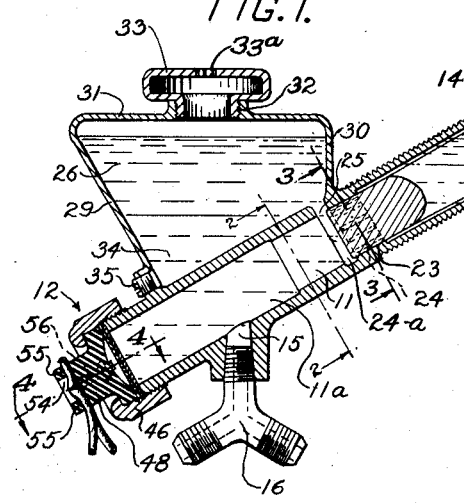
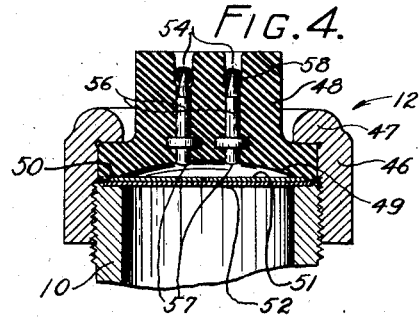
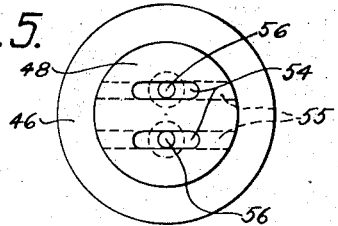
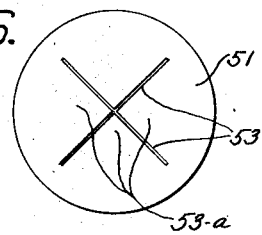
INVENTOR
Hugh M. Rockwell
BY George L. Ljungl
ATTORNEY Patented Apr. 23, 1935

1,998,821

UNITED STATES PATENT OFFICE 1,998,821

FLUID PRESSURE CONTROL CYLINDER FOR VEHICLES AND THE LIKE

Hugh M. Rockwell, Freeport, N. Y.

Refiled for application Serial No. 272,184, April 23, 1928. This application May 2, 1932, Serial No. 608,839

13 Claims. (Cl. 60—54.6)

This invention relates to improvements in hydraulic systems for motor vehicles and the like, and refers particularly to master cylinders for generating hydraulic pressure by the application of human energy.

In my pending application for Letters Patent for Stop light switches and brake systems for vehicles, filed May 28, 1927, Serial Number 195,107, I have disclosed a fluid pressure braking system wherein the master cylinder is connected with the pressure lubricating system of the engine, and wherein a pressure-responsive switch, having a diaphragm larger than the diameter of the master cylinder, is employed. For some purposes it may not be desired to have the master cylinder so connected to the engine lubricating system, and in such a case it will be necessary to replenish the supply of oil from time to time, to maintain a full body of oil in the master cylinder.

It is, therefore, an object of this invention to provide an improved master cylinder with an oil supply reservoir and which will be readily accessible for purposes of inspection, refilling, adjustment, or the like.

Another object is to provide such a master cylinder and oil supply reservoir which will be self-venting, of extremely simple construction, and capable of production at low cost.

The foregoing and other objects, features and advantages of the invention will be more fully appreciated from the following description in connection with the accompanying drawing, wherein the invention has been shown by way of illustration, and wherein Figure 1 is a vertical, longitudinal, sectional view through one form of master cylinder and stop light switch embodying the invention;

Figure 2 is a transverse, sectional view on line 2—2 of Figure 1;

Figure 3 is a transverse, sectional view on line 3—3 of Fig. 1;

Figure 4 is a longitudinal, sectional view on line 4—4 of Figure 1, on a larger scale;

Figure 5 is an end view of the novel stop light switch, and

Figure 6 is a detail plan view of the steel disc functioning as a combined spring and contact maker.

The present application is a refiling of my application Serial Number 272,184, filed April 23, 1928.

The improved master cylinder 10 may conveniently be formed as a tubular casting, which is relatively long in proportion to its diameter and having intermediate its ends a smooth bore 11 which constitutes the operative portion of the cylinder, and below said smooth bore 11 is a cored-out or counter-bored relief 11—a, which constitutes a pressure chamber. As clearly shown in Fig. 1, the cylinder 10 is mounted in an inclined position and has its lower end closed by a diaphragm switch 12, and its upper end provided with a packing gland 13. A plunger 14 is reciprocable within the master cylinder, whereby to impose pressure upon a body of oil contained therein, part of said oil being displaced to transmit such pressure through a port 15 and pipe fitting 16 to suitable conduits which conduct the oil to hydraulically actuated brakes, clutches, or the like, not shown. The plunger 14 is also relatively long, having a smooth exterior fitting snugly in the smooth bore 11, and is preferably free from packing rings, and the like. At its upper end, the plunger 14 is provided with a rod 17 which extends through the gland 13, and which carries at its outer end a pedal pad 18 having a rubber cover 19. Normally, the plunger 14 occupies a position of rest in the upper end of the cylinder, and is limited in its outward movement by a metal ring 20 engaging the shouldered end of the plunger, said ring assisting in the compression of suitable packing material 21 in the gland 13 to maintain a tight joint, and wipe off any oil that may adhere to the surface of the rod 17. The upper end of the cylinder is of an enlarged internal diameter, as indicated at 22, and the plunger is centrally guided during its reciprocation by the packing gland 13 and by the cylinder bore portion 23. This bore portion 23 is provided with a plurality of longitudinal grooves 24 which afford communication between the cylinder portion 22 and an annular groove 24—a at the upper end of the working portion of the cylinder.

A transverse port 25 intersects the annular groove 24—a at the upper side of the cylinder 10 to provide communication between the pressure chamber 11 and an oil supply reservoir 26, which is associated with the master cylinder, preferably being cast integral with it. This reservoir 26 comprises a pair of parallel side walls 27 and 28, end walls 29 and 30, a top wall 31 and the wall of the master cylinder constitutes a bottom wall which is inclined away from the port 25. A screw-threaded opening 32 in the top wall 31 provides convenient means for filling the reservoir, and is fitted with a removable closure plug or cap 33. The parts are so proportioned that the level of the oil in the reservoir 26 is below the packing gland 13, and thus any oil carried up on the side of the plunger or plunger rod is free to run down in the enlarged portion 22 of the cylinder bore. The inclination of the bottom wall of the reservoir provides a sediment chamber 34 in which any solid particles in the oil may settle, and for convenience, a drainage plug 35 is provided at substantially the lowest point in the end wall 29. The sidewalls 27 and 28 of the reservoir are preferably tangent to the master cylinder 10, as best shown in Fig. 2, whereby to render the device more compact and of neat appearance.

In mounting the device, for example, in an automobile, the upper end of the cylinder 10 may extend through an opening 36 in the toe board 37, with the reservoir 26 conveniently located in front of the dash 38, and in under the engine hood, where it is readily accessible for examination or refilling. Any desired form of mounting bracket may be employed, that illustrated comprising a depending body portion 39 secured to the dash, engine, steering gear housing or other suitable part of the vehicle, and a ball member 40 adjustably clamped in said body portion. The ball member 40 is centrally bored and screw-threaded for the reception of the exteriorly threaded portion 41 of the cylinder 10, and by virtue of this arrangement, the cylinder is adjustable longitudinally as well as angularly. This feature of adjustability may, of course, be omitted, but it facilitates the application of a single design of master cylinder to different makes of vehicles, and to suit the leg length of different operators.

It will be clear from the foregoing that as the pedal 18 is depressed, as by foot power, the plunger 14 moves downwardly against the body of oil in the pressure chamber 11 whereby to actuate brakes or the like in the hydraulic system. During such downward movement, the end of the plunger passes the port 25, cutting off communication between the chamber 11 and the reservoir 26, and when the foot pressure is released from the pedal, the plunger will be returned upwardly. If desired, a spring may be employed to augment the pressure of the returning oil, and when such a spring is used, it will move the plunger upwardly a sufficient distance to uncover the port 25, but if it is not used, it is only necessary to occasionally draw the plunger upwardly by means of the pedal, whereby to insure a full supply of oil in the master cylinder and the remainder of the hydraulic system. Incidentally, any air in the system will work its way upwardly, passing through the port 25 and into the reservoir from which it will be vented through a small opening 33—a in the cap 33.

This improved master cylinder above described is of extremely simple construction and capable of being easily and economically produced. A long, narrow cylinder with a long, straight bore for the accommodation of an ordinary piston is much more difficult to manufacture than the illustrated and described embodiment, and particularly in view of the fact that it is desired to eliminate packing rings and the like from the piston, the specific structure is important. When the plunger 14 is moved down to its lowermost position, its lower end is below the port 15, but it does not cut off said port because of the relief 11—a. This relief or counter-bore makes possible the connection of the fitting 16 at a relatively high point in the pressure chamber and close to the venting port 25.

The novel switch 12 comprises a nut 46 which is threaded or screwed on the lower end of the cylinder 10, and is provided with an inturned annular flange 47 for clampingly holding a cylindrical block 48 of dielectric material such as phenolic condensation product or hard rubber. The inner end of this dielectric block 48 is slightly concave, as indicated at 49, and is provided with a shallow counter-bore 50 in which is seated a thin yieldable disc 51, preferably formed of sheet steel or other resilient metal. This disc 51 is firmly clamped between the dielectric block 48 and the end of the cylinder, and is electrically insulated from the cylinder by a diaphragm 52 of dielectric sheet material, which constitutes the lower wall of the pressure chamber. The disc 51 may be more readily yieldable by radial slits 53, defining between them a plurality of sector-shaped brushes 53—a, which, because of their inherent resiliency, facilitate the return of the diaphragm 52 to normal position when the fluid pressure is released and which further serve as means for making and breaking electrical connection between contact members presently to be described.

The outer end of the dielectric block 48 extends beyond the nut 46 and is provided with a pair of narrow parallel recesses 54, each of which intersects a transverse hole 55 (Figs. 1 and 5), said recesses and holes being of substantially the same width as the diameter of an insulated stranded wire, such as is used in automotive electrical work. Extending longitudinally through the block 48 are a pair of spaced metallic contacts or terminals 56, which are preferably moulded in place and which have their inner ends 57 rounded and projecting slightly from the inner surface 49 of the dielectric block, while their outer ends are sharply pointed, as at 58, and disposed in the bottoms of the respective recesses 54. The arrangement is such that the pointed ends 58 of these contacts extend across the axes of the transverse holes 55, and are adapted to make connection with electrical conducting wires of a stop light circuit by piercing the insulation of the wire and contacting with the metallic core thereof. In making the connection, it is not necessary to "skin" the end of the wire or to use extraneous terminal clips, as has been customary in the prior art. It is merely necessary to thread one end of a wire through both portions of one of the holes 55 at opposite sides of the recess 54, pulling sufficient slack out in the recess 54 to clear the pointed end 58 of the contact member 56. Subsequently, a straight pull on the wire tends to draw the slack portion laterally inward against the pointed end 58, causing the same to pierce the insulation covering and the stranded wire core, making electrical contact therewith, and expanding the insulation covering against the side walls of the recess 54. Thus it will be seen that the wire will be firmly held by the pointed end of the contact member, augmented by the frictional engagement of the wire covering against the walls of the recess. In making the connection, the wire may be pushed against the pointed ends 58 by the use of any suitable tool, thus relieving the wire of tensile strain. The wire can be connected very easily and quickly, resulting in a substantial saving in labor, and this, coupled with the low cost due to simplicity of construction, renders the use of the device very economical.

When fluid pressure is generated within the master cylinder by depression of the pedal, as previously described, sufficient to actuate the brakes, the disc 51 and diaphragm 52 are caused to bulge outwardly until the diaphragm contacts with the inner rounded ends of the metallic inserts 56, closing the circuit between them and thus causing electrical energy from a battery or other source, as usual, to flow to and through a stop light or other signal. When the braking pressure is released, the diaphragm 52 returns to its original plane, due to the spring pressure of the sector-shaped portions 53—a of the disc 51. With such a switch, the stop signal is always synchronized with the braking pressure and without reducing the braking forces. The diaphragm 52 not only insulates the disc 51 but provides a tight seal to prevent leakage of oil from the cylinder to the inner surface of the dielectric block 48.

Obviously, changes may be resorted to in the details of construction and arrangement of parts, and the right is herein reserved to make such changes as fall within the scope of the appended claims, without departing from the spirit of the invention.

Having thus described my invention, what I claim is:

1. In or for a hydraulic control system for vehicles and the like, an inclined master cylinder which is relatively long in proportion to its width and adapted to contain a body of oil, a plunger reciprocable in said cylinder to impose pressure on the body of oil, said plunger normally occupying a position of rest at the upper end of the cylinder and the cylinder having a port intermediate its ends which will be cut off by the plunger when it is operating, and uncovered by the plunger when it is at rest, a plunger rod of smaller diameter than the plunger and extending through the upper end of the cylinder and carrying a pedal at its outer end, an oil supply reservoir integral with the cylinder for maintaining a full supply of oil in the cylinder by gravity feed through said port, and a packing gland through which the plunger rod slides, said gland being above the level of the oil in the reservoir.

2. In or for a hydraulic control system for vehicles and the like, an inclined master cylinder which is relatively long in proportion to its width and adapted to contain a body of oil, a plunger reciprocable in said cylinder to impose pressure on the body of oil, said plunger normally occupying a position of rest in the upper end of the cylinder, and the cylinder having a port intermediate its ends which will be cut off by the plunger when it is operating, and uncovered by the plunger when it is at rest, a plunger rod of smaller diameter than the plunger and extending through the upper end of the cylinder and carrying a pedal at its outer end, an oil supply reservoir integral with the cylinder for maintaining a full supply of oil in the cylinder by gravity feed through said port, and a packing gland through which the plunger rod slides, said gland being above the level of the oil in the reservoir and the upper end of the cylinder being relieved to permit drainage of oil from the gland and the sides of the plunger.

3. In or for a hydraulic control system for vehicles and the like, a relatively long and narrow inclined master cylinder adapted to contain a body of oil, a plunger reciprocable therein to impose pressure on the body of oil, the cylinder having a vent port intermediate its ends which is covered or cut off by the plunger in its pressure stroke, and an oil supply reservoir mounted entirely above the cylinder and cast integrally therewith with its interior in communication with said vent port, the side walls of said reservoir being substantially parallel and tangent to the sides of the cylinder, and the top wall of the cylinder forming the bottom of the reservoir and being inclined downwardly from said vent port to provide a sediment chamber.

4. In or for a hydraulic control system for vehicles and the like, a relatively long and narrow inclined master cylinder adapted to contain a body of oil, a plunger reciprocable in said cylinder to impose pressure on the body of oil, said plunger normally occupying a position of rest at the upper end of the cylinder, a plunger rod extending through the upper end of the cylinder and carrying a pedal, and an oil supply reservoir integral with the cylinder for maintaining a full supply of oil in the cylinder, the side walls of the reservoir being substantially parallel and tangent to the sides of the cylinder and the bottom wall of the reservoir being inclined to provide a sediment chamber, and a packing gland through which the plunger rod slides, said gland being above the level of the oil in the reservoir.

5. In or for a hydraulic control system for vehicles and the like, an inclined master cylinder which is relatively long in proportion to its width, the interior of said cylinder having a short working bore portion intermediate its ends and a relieved or counterbored portion at each end of said working bore portion, the lower one of said relieved portions constituting a pressure chamber, a long and relatively thin plunger reciprocable in said master cylinder and having a plunger rod extending therebeyond, a packing gland at the upper end of the cylinder, said packing gland constituting an axial guide for one end of the plunger, and the working bore constituting a guide for the other end of the plunger, the plunger normally occupying a position of rest in the upper end of the cylinder, an oil supply reservoir mounted on the upper side of the cylinder and having a port communicating with the working bore at a point adjacent the normal position of rest of the lower end of the plunger, the level of oil in the reservoir being below the packing gland for the plunger rod, and fluid conduit connecting means connected to the pressure chamber at a point intermediate the two extreme positions of the inner end of the plunger.

6. In or for a hydraulic control system for vehicles and the like, an inclined master cylinder adapted to be disposed below the toe board of a vehicle and extending to a position forwardly of the plane of the dash, a plunger reciprocable in the cylinder, a plunger rod extending upwardly through the toe board, and an oil supply reservoir integral with the master cylinder at the upper side thereof, but below the toe board, said reservoir being readily accessible for filling when mounted in a vehicle, and being in communication with the cylinder through an unobstructed passageway which is controlled solely by the inner end of the plunger.

7. In or for a hydraulic control system for vehicles and the like, a master cylinder adapted to be mounted in an inclined position below the toe board and in front of the dash of a vehicle, said cylinder having a working bore portion intermediate its ends, a plunger reciprocable in the cylinder and having a stroke longer than the working bore portion, said plunger normally occupying a position of rest at the upper end of the cylinder, and carrying a pedal, oil supply means communicating with the cylinder adjacent the upper end of the working bore portion, a packing gland through which the plunger rod slides, said gland being above the level of the oil in the oil supply means and the upper end of the cylinder having an enlarged internal diameter, and a longitudinally grooved pilot adjacent the upper end of the working bore to axially guide the plunger and afford communication between said enlarged diameter of the cylinder and the oil supply means when the plunger is in its position of rest.

8. In or for a hydraulic control system for vehicles and the like, an inclined cylinder adapted to contain a body of oil, a plunger reciprocable therein to impose pressure on the body of oil, the cylinder having a vent port intermediate its ends which is covered or cut off by the plunger in its pressure stroke, and an oil supply reservoir mounted entirely above the cylinder and cast integrally therewith with its interior in communication with said vent port, the side walls of said reservoir being substantially parallel and tangent to the sides of the cylinders, and the top wall of the cylinder forming the bottom of the reservoir and providing a sediment chamber below the vent port.

9. In or for a hydraulic control system for vehicles and the like, an inclined cylinder adapted to contain a body of oil, a plunger reciprocable in said cylinder to impose pressure on the body of oil, said plunger normally occupying a position of rest at the upper end of the cylinder, a plunger rod extending through the upper end of the cylinder and having actuating means at its outer end, an oil supply reservoir integral with the cylinder for maintaining a full supply of oil in the cylinder, the side walls of the reservoir being substantially parallel and tangent to the sides of the cylinder and the bottom wall of the reservoir being inclined to provide a sediment chamber.

10. In or for a hydraulic control system for vehicles and the like, an inclined cylinder adapted to contain a body of oil, a plunger reciprocable in said cylinder to impose pressure on the body of oil, said plunger normally occupying a position of rest at the upper end of the cylinder, a plunger rod extending through the upper end of the cylinder and having actuating means at its outer end, an oil supply reservoir integral with the cylinder for maintaining a full supply of oil in the cylinder, the side walls of the reservoir being substantially parallel and tangent to the sides of the cylinder and the bottom wall of the reservoir being inclined to provide a sediment chamber and a packing gland through which the plunger rod slides, said gland being above the level of the oil in the reservoir.

11. In or for a hydraulic control system for vehicles and the like, an inclined cylinder which is adapted to contain a body of oil, a plunger reciprocable in said cylinder to impose pressure on the body of oil, said plunger normally occupying a position of rest at the upper end of the cylinder and the cylinder having a port intermediate its ends which will be cut off by the plunger when it is operating, and uncovered by the plunger when it is at rest, a plunger rod of smaller diameter than the plunger and extending through the upper end of the cylinder, an oil supply reservoir integral with the cylinder for maintaining a full supply of oil in the cylinder by gravity feed through said port, and a packing gland through which the plunger rod slides, said gland being above the level of the oil in the reservoir.

12. In or for a hydraulic control system for vehicles and the like, an inclined master cylinder the interior of which is formed with a working bore portion intermediate its ends and a relieved or counterbored portion at each end of said working bore portion, the lower one of said relieved portions constituting a pressure chamber, a plunger reciprocable in said cylinder and having a plunger rod extending therebeyond, a packing gland at the upper end of the cylinder, said packing gland constituting an axial guide for one end of the plunger, and the working bore constituting a guide for the other end of the plunger, the plunger normally occupying a position of rest in the upper end of the cylinder, an oil supply reservoir mounted on the upper side of the cylinder and having a port communicating with the working bore at a point adjacent the normal position of rest of the lower end of the plunger, the level of oil in the reservoir being below the packing gland for the plunger rod, and fluid conduit connecting means connected to the pressure chamber.

13. In or for a hydraulic control system for vehicles and the like, an inclined master cylinder adapted to contain pressure fluid, a plunger reciprocable in the cylinder and normally occupying a position of rest at the upper end of the cylinder, fluid supply means communicating with the cylinder adjacent the normal position of rest of the lower end of the plunger, a packing gland through which the plunger rod slides, said gland being above the level of the fluid in the fluid supply means, and the upper end of the cylinder having an enlarged internal diameter, and a longitudinally grooved pilot adjacent the upper end of the working portion of the cylinder to axially guide the plunger and afford communication between said enlarged diameter of the cylinder and the fluid supply means when the plunger is in its position of rest.

HUGH M. ROCKWELL.